(12) United States Patent
Bao et al.

(10) Patent No.: US 10,975,834 B2
(45) Date of Patent: Apr. 13, 2021

(54) FLOATING WAVE POWER GENERATOR CAPABLE OF LIFTING UNDER REMOTE CONTROL

(71) Applicant: CHINA UNIVERSITY OF PETROLEUM (EAST CHINA), Qindao (CN)

(72) Inventors: Xingxian Bao, Qindao (CN); Shubo Li, Qindao (CN); Jinzhi Qu, Qindao (CN); Teng Wang, Qindao (CN)

( * ) Notice: Subject to any disclaimer, the term of this patent is extended or adjusted under 35 U.S.C. 154(b) by 0 days.

(21) Appl. No.: 16/665,618

(22) Filed: Oct. 28, 2019

(65) Prior Publication Data

US 2020/0217292 A1 Jul. 9, 2020

(30) Foreign Application Priority Data

Jan. 9, 2019 (CN) .......................... 201910019638.2

(51) Int. Cl.
*F03B 13/00* (2006.01)
*F03B 13/14* (2006.01)
*H02K 7/18* (2006.01)

(52) U.S. Cl.
CPC ........... *F03B 13/14* (2013.01); *H02K 7/1876* (2013.01)

(58) Field of Classification Search
CPC ... F03B 13/14; F03B 13/1845; H02K 7/1876; F05B 2270/18; F05B 2220/707; Y02E 10/30
See application file for complete search history.

(56) References Cited

U.S. PATENT DOCUMENTS 10,240,575 B2 * 3/2019 Dragic ................. F03B 13/186
2018/0073482 A1 * 3/2018 Sheldon-Coulson ... F16H 19/06

* cited by examiner

*Primary Examiner* — Julio C. Gonzalez
(74) *Attorney, Agent, or Firm* — Egbert Law Offices, PLLC

(57) ABSTRACT

A floating wave power generator is capable of lifting under remote control, and includes a linear generator fixed to a seabed and a floating assembly connected with the linear generator, where the floating assembly includes a lower floating body connected with a motor of the linear generator through an anchor chain, an upper floating body connected with the lower floating body through a rigid rod and floating on the sea surface, where the upper floating body is used for collecting wave energy and controlling the buoyancy of the whole floating assembly, the lower floating body is used for assisting the upper floating body to collect wave energy and controlling a distance between the whole floating assembly and the linear generator, the motor of the linear generator is used for cutting magnetic induction lines to generate electric power according to a lift-up/down movement of the whole floating assembly.

9 Claims, 1 Drawing Sheet

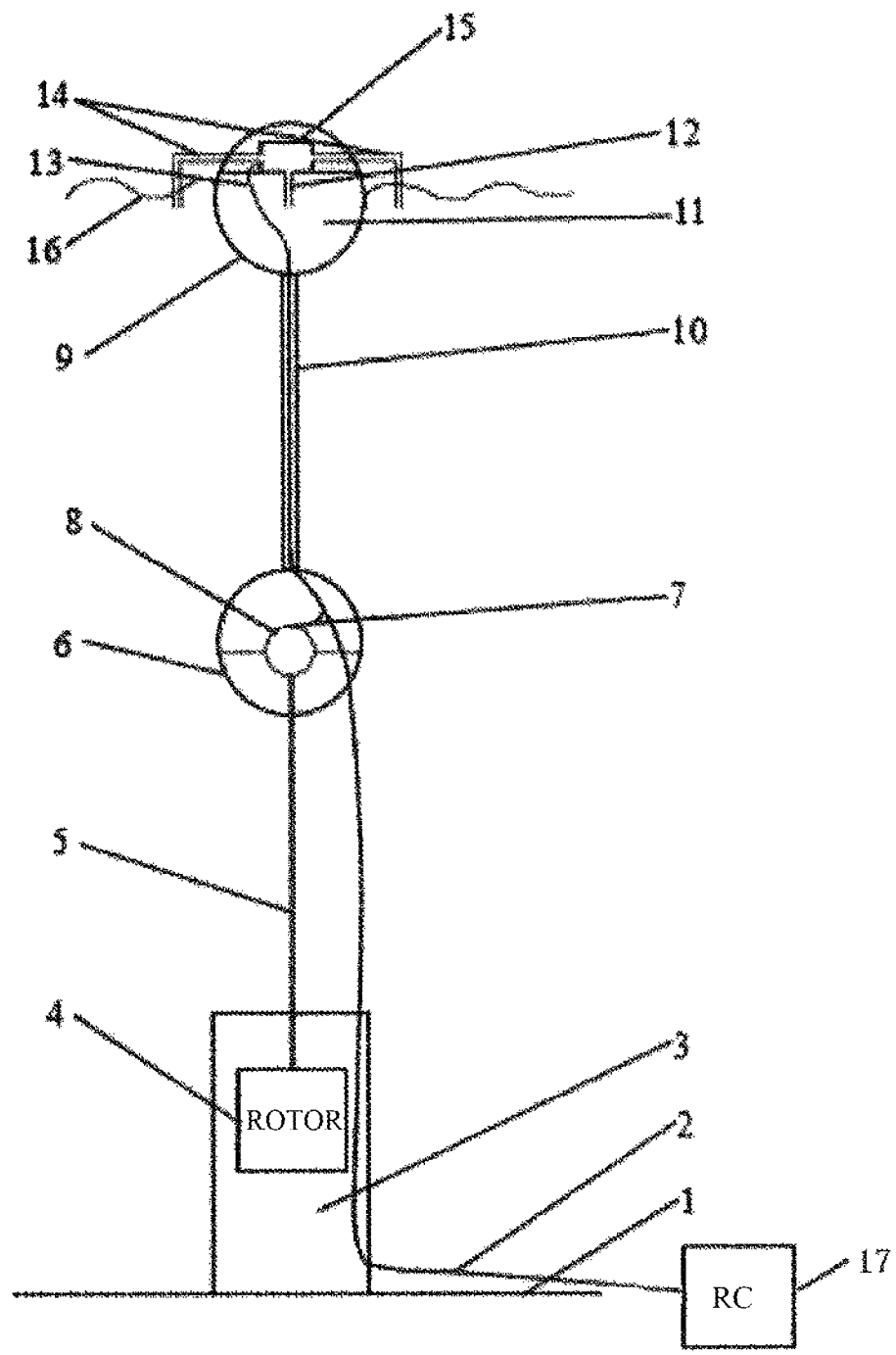

FLOATING WAVE POWER GENERATOR CAPABLE OF LIFTING UNDER REMOTE CONTROL

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the field of wave power generation, and in particular, to a floating wave power generator capable of lifting under remote control.

2. Description of Related Art Including Information Disclosed Under 37 CFR 1.97 and 37 CFR 1.98

Wave power as a clean renewable energy source has the characteristics of large reserve, wide distribution, high energy flux density and the like, and is highly valued by every country in the world day by day. Although there are multiple researches on the wave power generator, people mostly pay attention to the research on how to improve power generation efficiency, and rarely are studies done to determine how a generator keeps safe in severe weather such as typhoon and the like. In severe weather, the generator cannot effectively work and urgently needs to avoid the danger for its own safety. Furthermore, it is well worthy of attention as to how to control lifting of the generator to adapt to different tidal levels to obtain higher power generation efficiency in a sea area with a great tide range.

BRIEF SUMMARY OF THE INVENTION

To overcome the deficiencies of the prior art, the present invention provides a floating wave power generator capable of lifting under remote control, which can automatically sink to the seabed to avoid damage in severe sea weather and can automatically float on the sea surface to continue to work in good sea weather, and additionally, which can be controlled to lift to adapt to different tidal levels to obtain higher power generation efficiency in a sea area with a great tide range.

To achieve the above objectives, a technical solution of the present invention is as follows:

a floating wave power generator capable of lifting under remote control includes a linear generator fixed to a seabed and a floating assembly connected with the linear generator, where the floating assembly includes a lower floating body connected with a rotor of the linear generator through an anchor chain, and an upper floating body connected with the lower floating body through a rigid rod and floating on the sea surface, where the upper floating body is used for collecting wave energy and controlling the buoyancy of the whole floating assembly, the lower floating body is used for assisting the upper floating body to collect wave energy and controlling a distance between the whole floating assembly and the linear generator, the rotor of the linear generator is used for cutting magnetic induction lines to generate electric power according to a lift-updownwardly movement of the whole floating assembly, and the upper floating body and the lower floating body are connected with a remote control system.

Furthermore, the upper floating body is formed by an upper chamber and a lower chamber, the upper chamber is used for mounting a two-way water pump, the lower chamber is a ballast tank, and the upper floating body controls an amount of water flowing into the ballast tank through the two-way water pump so as to control the buoyancy of the whole floating assembly.

Furthermore, water pipes are symmetrically arranged on two sides of the two-way water pump, and the water pipes are communicated with seawater.

Furthermore, a water pipe is arranged at the bottom of the two-way water pump, and the water pipe is communicated with the ballast tank.

Furthermore, the two-way water pump is connected with the remote control system through a control cable.

Furthermore, when the ballast tank has no seawater, the buoyancy of the upper floating body is greater than the weight thereof such that the upper floating body floats on the sea surface; and when the ballast tank is full of seawater, the buoyancy of the upper floating body is less than the weight thereof such that the upper floating body sinks into the sea.

Furthermore, a windlass is fixed to the interior of the lower floating body, the windlass is connected with the anchor chain, and the windlass is used for controlling the distance between the whole floating assembly and the linear generator by retracting or releasing the anchor chain.

Furthermore, the windlass is connected with the remote control system through the control cable.

Furthermore, the windlass is further used for controlling a position of the rotor of the linear generator by retracting or releasing the anchor chain to ensure that the rotor is located at the center of the linear generator when the sea is calm.

Furthermore, the rigid rod has a hollow structure for facilitating penetration of the control cable through the rigid rod.

Compared with the prior art, beneficial effects of the present invention lie in:

1) the present invention can avoid severe weather such as typhoon and the like: the present invention can automatically sink to the seabed to avoid damage in severe sea weather and can automatically float on the sea surface to continue to work in good sea weather; and
2) the present invention can adapt to different tidal levels: the present invention can be controlled to lift to adapt to different tidal levels to obtain higher power generation efficiency in a sea area with a great tide range.

BRIEF DESCRIPTION OF THE SEVERAL VIEWS OF THE DRAWINGS

The accompany drawings of the specification constituting a part of the present invention provide further understanding of the present invention. The schematic embodiments of the present invention and the description thereof are intended to be illustrative of the present invention and do not constitute an undue limitation of the present invention.

FIG. 1 is a schematic structural diagram of a floating wave power generator capable of lifting under remote control in a certain embodiment of the present invention.

In the drawing: 1—seabed, 2—control cable, 3—linear generator, 4—motor 4—rotor, 5—anchor chain, 6—lower floating body, 7—branch cable for controlling a windlass, 8—windlass, 9—upper floating body, 10—rigid rod, 11—ballast tank, 12—water pipe communicated with the ballast tank, 13—branch cable for controlling a two-way water pump, 14—water pipe communicated with seawater, 15—two-way water pump, and 16—sea surface and 17—remote control system.

DETAILED DESCRIPTION OF THE INVENTION

The following further describes the present invention with reference to the accompanying drawings and specific embodiments.

It should be noted that the following detailed description is exemplary and aims to further describe the present invention. Unless otherwise defined, all technical and scientific terms used herein have the same meaning as commonly understood by one of ordinary skilled in the art to which the present invention pertains.

It should be noted that the terms used herein are merely used for describing the specific embodiments, but is not intended to limit exemplary embodiments of the present invention. As used herein, the singular form is also intended to include the plural form unless otherwise indicated obviously from the context. Furthermore, it should be further understood that the terms "includes" and/or "including" used in this specification specify the presence of stated features, steps, operations, elements, components and/or their groups.

In the present invention, orientations or position relationships indicated by terms "upper", "lower", "left", "right", "front", "back", "vertical", "horizontal", "side", "bottom", etc. are orientations or position relationships as shown in the drawings, and these terms are relational words just used to facilitate description of structure relationships of parts or elements of the present invention, but not to specifically indicate any part or element of the present invention, and thus, these terms cannot be understood as a limitation to the present invention.

In the present invention, the terms "fixed", "connected" and "connection" should be understood broadly, which may be fixed connection, integral connection or detachable connection; may also be direct connection; and may also be indirect connection through an intermediate component. Scientific researchers or technicians related to the art may determine specific meanings of the foregoing terms in the present invention based on a specific situation, but cannot understand to be limitations to the present invention.

As shown in FIG. 1, a floating wave power generator capable of lifting under remote control includes a linear generator 3 fixed to a seabed 1 and a floating assembly connected with the linear generator 3, the floating assembly includes a lower floating body 6 connected with a rotor 4 of the linear generator 3 through an anchor chain 5, and an upper floating body 9 connected with the lower floating body 6 through a rigid rod 10 and floating on the sea surface 16, where the upper floating body 9 is used for collecting wave energy and controlling the buoyancy of the whole floating assembly, the lower floating body 6 is used for assisting the upper floating body 9 to collect wave energy and controlling a distance between the whole floating assembly and the linear generator 3, the rotor 4 of the linear generator is used for cutting magnetic induction lines to generate electric power according to a lift-updownwardly movement of the whole floating assembly, and the upper floating body 9 and the lower floating body 6 are connected with a remote control system 17.

The upper floating body 9 is formed by an upper chamber and a lower chamber, the upper chamber is used for mounting a two-way water pump 15, the lower chamber is a ballast tank 11, and the upper floating body 9 controls an amount of water flowing into the ballast tank 11 through the two-way water pump 15 so as to control the buoyancy of the whole floating assembly.

Water pipes 14 are symmetrically arranged on two sides of the two-way water pump 15, and the water pipes 14 are communicated with seawater, that is, an opening of the water pipe ensures to be submerged.

A water pipe 12 is arranged at the bottom of the two-way water pump 15, and the water pipe 12 is communicated with the ballast tank 11.

A windlass 8 is fixed to the interior of the lower floating body 6, the windlass 8 is connected with the anchor chain 5, and the windlass 8 is used for controlling the distance between the whole floating assembly and the linear generator 3 by retracting or releasing the anchor chain 5.

During specific implementation, connection portions of the upper floating body 9 and the water pipes 14 communicated with seawater and a cable penetration portion of the upper floating body 9 all ensure excellent seal, the upper chamber and the lower chamber ensure excellent seal, and a cable penetration portion of the lower floating body 6 also ensures excellent seal.

At normal working state, the buoyancy of the upper floating body and the lower floating body is greater than the total weight thereof. When the sea is calm, the motor 4 is located at the central position of the linear generator 3, and the anchor chain 5 connected with the rotor 4 is tensioned; when the sea generates waves, the upper floating body and the lower floating body conduct the lift-updownwardly movement, and the whole floating assembly lifts up to drive the rotor 4 to lift up; and when the whole floating assembly lifts down, the anchor chain 5 connected with the rotor 4 is loosened, the motor 4 moves downwards depending on its own weight, and the rotor 4 cuts the magnetic induction lines to generate electric power according to the electromagnetic induction principle.

The windlass 8 is connected with the remote control system through a control cable 2, and the two-way water pump 15 is connected with the remote control system 17 through the control cable 2.

During specific implementation, the generator needs a transmission cable to transmit the generated electric power to the land so as to be capable of laying the control cable 2 while laying the transmission cable, the control cable 2 penetrates the linear generator 3 and is connected with the lower floating body 6, a branch cable 7 for controlling starting and stopping of the windlass 8 leads out, and then the control cable 2 enters the upper floating body 9 by penetrating the rigid rod 10 connecting the upper floating body with the lower floating body, and a branch cable 13 for controlling starting and stopping of the two-way water pump 15 leads out.

In severe sea weather, an operator can start the windlass 8 through the control cable 2 on the shore, the windlass 8 rotates to retract the anchor chain 5, and the linear generator 3 is fixed to a seabed 1, so the lower floating body 6 is pulled towards the linear generator 3.

Simultaneously, the operator starts the two-way water pump 15 through the control cable 2 on the shore to pump seawater into the ballast tank 11 such that the weight of the upper floating body 9 is greater than the buoyancy thereof and the upper floating body 9 sinks to the seabed, and because the upper floating body and the lower floating body are connected by the rigid rod 10, the upper floating body 9 does not touch the linear generator 3 to cause damage after lifting down.

When severe sea weather is over, the control cable 2 controls the windlass 8 to reversely rotate to release the anchor chain 5 and also controls the two-way water pump 15 to pump water from the ballast tank 11 to the sea such that the buoyancy of the upper floating body 9 is greater than the weight thereof and then the upper floating body 9 floats on the sea surface, and the wave generator continues to work.

Additionally, the design of the present invention can further deal with change of the sea tidal level. A position of the rotor 4 can be controlled by releasing or retracting the anchor chain 5 at the high tidal level or low tidal level to ensure that the rotor 4 is located at the center of the linear generator 3 when the sea is calm.

The foregoing is merely illustrative of the preferred embodiments of the present invention and is not intended to limit the present invention, and various changes and modifications may be made by those skilled in the art. Any modifications, equivalent substitutions, improvements, etc. made within the spirit and scope of the present invention should be included within the protection scope of the present invention.

The above describes the specific embodiments of the present invention with reference to the accompanying drawings, but is not intended to limit the protection scope of the present invention. Those skilled in the art should understand that any modifications or transformations made by those skilled in the art without creative efforts still fall within the protection scope of the present invention based on the technical solutions of the present invention.

We claim:

1. A floating wave power generator apparatus comprising:
    a linear generator adapted to be affixed to a seabed, said linear generator having a rotor;
    a floating assembly connected to said linear generator, said floating assembly comprising:
        a lower floating body connected to the rotor of said linear generator through an anchor chain; and
        an upper floating body connected to said lower floating body through a rigid rod, said upper floating body adapted to float on a sea surface, wherein said upper floating body is adapted to collect wave energy and to control buoyancy of said floating assembly and to control a distance between said floating assembly and said linear generator, wherein the rotor of said linear generator generates electric power in relation to an upward and downward movement of said floating assembly; and
    a remote control system connected to said upper floating body and said lower floating body, wherein said upper floating body has an upper chamber and a lower chamber, the upper chamber having a two-way water pump mounted thereto, the lower chamber being a ballast tank, said upper floating body controlling an amount of water flowing into the ballast tank by the two-way water pump so as to control the buoyancy of said floating assembly.

2. The floating wave power generator apparatus of claim 1, wherein water pipes are symmetrically arranged on opposite sides of the two-way water pump, the water pipes being adapted to communicate with sea water.

3. The floating wave power generator apparatus of claim 1, wherein a water pipe is positioned at a bottom of the two-way water pump, the water pipe communicating with the ballast tank.

4. The floating wave power generator apparatus of claim 1, wherein the two-way water pump is connected to the remote control system through a control cable.

5. The floating wave power generator apparatus of claim 1, wherein a buoyancy of said upper floating body is greater than a weight of said upper floating body when the ballast tank has no sea water therein such that said upper floating body floats on the sea surface, wherein the buoyancy of said upper floating body is less than the weight of said upper floating body when the ballast tank is fill of sea water such that said upper floating body sinks below the sea surface.

6. The floating wave power generator apparatus of claim 1, further comprising:
    a windlass fixed to an interior of said lower floating body, said windlass being connected to the anchor chain, said windlass adapted to control a distance between said floating assembly and said linear generator by retracting or releasing the anchor chain.

7. The floating wave power generator apparatus of claim 4, wherein said windlass is connected to the remote control system through the control cable.

8. The floating wave power generator apparatus of claim 1, wherein said windlass controls a position of the rotor of said linear generator by retracting or releasing the anchor chain such that the rotor is positioned at a center of said linear generator when the sea surface is calm.

9. The floating wave power generator apparatus of claim 4, wherein the rigid rod is hollow, the control cable extending through the rigid rod.

* * * * *